United States Patent
Munshi et al.

(10) Patent No.: US 6,919,908 B2
(45) Date of Patent: Jul. 19, 2005

(54) METHOD AND APPARATUS FOR GRAPHICS PROCESSING IN A HANDHELD DEVICE

(75) Inventors: Aaftab A. Munshi, Los Gatos, CA (US); Mark H. Sternberg, Toronto (CA)

(73) Assignee: ATI Technologies, Inc., Markham (CA)

( * ) Notice: Subject to any disclaimer, the term of this patent is extended or adjusted under 35 U.S.C. 154(b) by 108 days.

(21) Appl. No.: 10/635,379

(22) Filed: Aug. 6, 2003

(65) Prior Publication Data

US 2005/0030320 A1 Feb. 10, 2005

(51) Int. Cl.$^7$ .............................................. G06T 15/30
(52) U.S. Cl. ....................................................... 345/620
(58) Field of Search ................................ 345/620, 621, 345/622, 623, 624

(56) References Cited

U.S. PATENT DOCUMENTS

| | | | | |
|---|---|---|---|---|
| 5,079,719 A | * | 1/1992 | Maillot ...................... | 345/622 |
| 5,877,773 A | * | 3/1999 | Rossin et al. ............... | 345/621 |
| 5,986,669 A | * | 11/1999 | Kirkland .................... | 345/620 |
| 2004/0164999 A1 | * | 8/2004 | Marion et al. .............. | 345/620 |

OTHER PUBLICATIONS

Sutherland, Ivan E. and Gary W. Hodgman, "Reentrant Polygon Clipping", Jan. 1974, ACM Press, NY, NY Communication of the ACM, vol. 17, No. 1.*

* cited by examiner

Primary Examiner—Michael Razavi
Assistant Examiner—Michelle K. Lay
(74) Attorney, Agent, or Firm—Vedder, Price, Kaufman & Kammholz, P.C.

(57) ABSTRACT

The present invention includes a method and apparatus for graphics processing in a handheld device including a transform engine capable of receiving vertex information. The transform engine generates a plurality of vertices from the vertex information, wherein each of the vertices includes a corresponding bin identifier. The method and apparatus further includes view frame factors defining a clipping region such that when any of the plurality of vertices is within the clipping region, a clip identifier is generated for that vertex using the corresponding bin identifier. A vertex shader coupled to a clipping module, wherein the clipping module generates supplemental vertices and the vertex shader receives the supplemental vertices therefrom. The vertex shader combines the supplemental vertices with the bin identifiers and are provided to a vertex buffer.

30 Claims, 7 Drawing Sheets

METHOD AND APPARATUS FOR GRAPHICS PROCESSING IN A HANDHELD DEVICE

FIELD OF THE INVENTION

The present invention relates generally to graphics processing and more specifically to graphics rendering in a handheld device.

BACKGROUND OF THE INVENTION

With the growth of modern computing trends, there is an increased demand in portability and improved functionality of a handheld device, wherein a handheld device may be, but not limited to, a cellular phone, a personal digital assistant (PDA), a pager, a smart phone, or any other suitable portable electronic device capable of providing graphical interactivity, as recognized by one having ordinary skill in the art. Furthermore, with the convergence of handheld devices having improved functionality and stand alone computing systems, such as a desktop or laptop computer, having greater interactivity with the handheld device, there is a greater demand for improved functionality and quality of interactivity between multiple handheld devices and also interactivity between the handheld device and the stand alone computing system.

An emerging area in handheld devices is the development of interactive video games to be played on the handheld device. With these graphic intensive applications, there exist prior art limitations with regard to graphical architecture for generating the graphical output. One common problem in the handheld device is the limited power and memory resources. Current graphics rendering techniques, including three-dimensional graphics rendering techniques, require an extensive amount of power to perform the various and multiple steps in a graphics-processing pipeline. Furthermore, three-dimensional graphics rendering may also be memory intensive due to memory requirements for storing, among other things, vertex information, pixel information, and/or texture data. In modern handheld devices, due to size requirements and power requirements, there is an extremely limited amount of available space for providing memory resources and power consumption constraints severely restrict graphics rendering while maintaining an extended mobile device battery life.

It would be extremely inefficient to use existing graphics processing techniques in modern handheld devices. For example, the handheld device includes a central processing unit (CPU) which controls functions for the handheld device, such as in the example wherein the handheld device is a cellular telephone, but the central processor must coordinate the operations of the various components to allow for communication and internal operations. Available processing cycles within the handheld device CPU severally restricts the graphics processing availability and/or the quality of a rendered image.

One solution for overcoming CPU computation limitations is the offloading of processing requirements to subsequent processors, such as a graphics processor, similarly found in devices, such as laptop computers and desktop computers. Although, a current solution is the performance of fixed function transformations of the rendering data, such as vertex information, by the CPU and triangle setup/ rasterization computations by an external graphics hardware device, such as a graphics processor. Typically, current handheld device CPUs do not support floating point calculations and also have very poor transform performance, which results in the handheld device being unable to render an image have a high polygon number, thereby limiting the quality of the subsequent output display.

Other limitations found within current handheld devices are limited physical real-estate for placing graphics rendering engines and also limited bandwidth availability for processing the graphics rendering data. As handheld devices become more compact, there exists less real-estate for the insertion of additional processors for performing the graphics processing operations, such as two-dimensional or three-dimensional rendering. Furthermore, the available bandwidth for transmitting the graphics rendering data is also limited. Among other things, size constraints prohibit a large data bus for graphics rendering information and therefore can severely restrict the processing speed and/or quality of a graphics rendering engine.

Therefore, a need exists for a method and apparatus that overcomes power consumption requirements, limited memory resources, limited graphics transformation processing within the handheld device and provides for graphics rendering effectively augmenting the limited available resources within the mobile device.

DETAILED DESCRIPTION OF A PREFERRED EMBODIMENT

Figure 1:
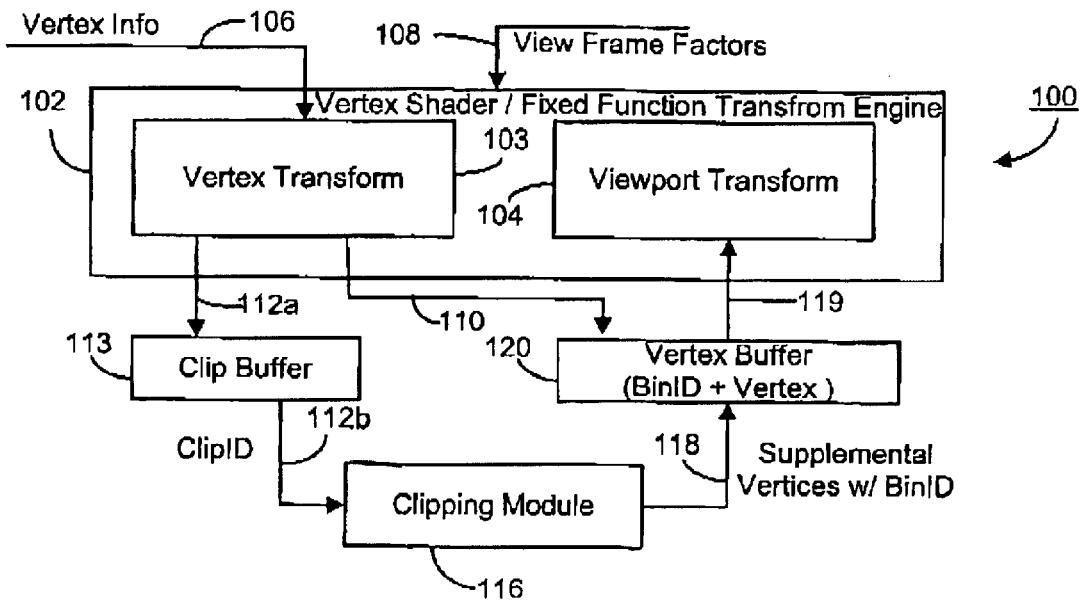
FIG. 1 illustrates a functional block diagram of an apparatus for graphics processing in a handheld device, in accordance with one embodiment of the present invention.

Generally, the present invention includes a method and apparatus for graphics processing in a handheld device including a transform engine or vertex shader capable of receiving vertex information. The transform engine may be a fixed function transform engine capable of performing fixed function transformations on the vertex information or a programmable vertex shader. Regardless thereof, the transform engine thereupon generates a plurality of vertices from the vertex information, wherein each of the vertices includes a corresponding bin identifier. In one embodiment, the bin identifier is a multi-bit categorization of the associated vertex relative to its position on the screen.

The method and apparatus further includes a plurality of view frame factors which include factors for defining a clipping region. The clipping region includes the areas outside of the viewable region such that vertices within the clipping region are not visible and therefore may be clipped to reduce computation overhead. In one embodiment, the vertex shader compares each of the plurality of vertices relative to the clipping region and when one of the vertices is within the clipping region, a clip identifier is generated for that vertex using the corresponding bin identifier. In accordance with one embodiment, the clip identifier is a multi-bit association of the vertices within the clipping region.

The vertex shader is operably coupled to the clipping module such that the method and apparatus further provides that the vertex shader provides the vertices having corresponding clip identifiers to the clipping module which thereupon generates supplemental vertices and the vertex shader may receive the supplemental vertices therefrom. In one embodiment, the supplemental vertices are newly created vertices within the viewable region and outside of the clipping region. The method and apparatus further includes a vertex buffer coupled to the vertex shader, wherein vertex buffer receives and stores the plurality of vertices and the supplemental vertices from the vertex shader.

As such, the present invention provides for a graphics processing in a handheld device by performing vertex transformations in two steps. The first step transforms the vertices and outputs the transformed vertex buffer with a bin identifier and if the vertex is inside the clipping region writes the clip identifier. In the second step the vertices are projected on to the screen using the view frame factors and the triangles are rendered. By breaking the vertex transformation into two steps this allows us to perform clipping on the CPU instead of on the graphics processor. Since the percentage of vertices that need clipping represent a very small number, this allows us to do clipping on the CPU without introducing too much additional overhead on the CPU and keep the gate count size down for the graphics processor which is extremely important since it affects power consumption. Another scarce resource is memory footprint available during rendering and it is possible that there will be configurations where we cannot allocate an entire Z, back buffer. This means that we need to break viewport rendering into multiple sub regions and render triangle lists into each of these regions. Since the same triangle list is being passed as input over multiple sub regions this results in wasted memory bandwidth since vertex data would have to be read multiple times (once for each sub-region) before deciding whether triangle is displayed in current sub-region and should be rendered or not. To reduce this memory bandwidth wastage the bin identifier is used. Instead of reading the vertex data first, we read the bin identifiers for vertices associated with a triangle. The vertex bin identifiers are used to determine if a triangle is displayed in current sub-region and if so the and then only the vertex data is read.

More specifically, FIG. 1 illustrates a graphics processing apparatus 100 having a vertex shader 102. The vertex shader 102 may be a fixed function transform engine capable of performing fixed function transformations on incoming data, such as vertex information 106 or can be a programmable vertex shader. In one embodiment, the vertex information 106 is transformed to generate a plurality of vertices, wherein each of the vertices has a corresponding bin identifier 110, which is described in further detail below in FIG. 4. In one embodiment, the vertex shader 102 includes a vertex transform engine 103 and a veiwport transform engine 104 which may be implemented in either hardware, software or a combination thereof for performing operations as discussed below.

The vertex shader 102 receives a plurality of view frame factors 108 which include any associated factors for determining a clipping region defining the viewable area of an output display. For example, the view frame factors 108 may include a guard band layer and the coordinates of a view frame frustum. As recognized by one having ordinary skill in the art, any other suitable view frame factor may be utilized to define the clipping region.

The vertex shader 102 thereupon determines if each of the vertices is within the viewable region by a comparison of the associated bin identifiers 110 with the boundaries of the clipping region. For all vertices that are within the clipping region, a corresponding clip identifier 112a is generated. The clip identifier 112a provides an indication of the vertex bin identifier 110 and other information for generating supplemental vertices 118. The clip identifiers 112a and 112b are discussed in further detail below with regards to FIG. 5.

Once all of the bin identifiers 110 have been compared with the clipping region, the clip identifiers 112b are provided to a clipping module 116. In one embodiment, the clip identifiers 112a may be provided to a clip buffer 113 for intermediate storage therein, wherein the clip identifiers 112b may be further provided to the clipping module 116. In one embodiment, the clipping module 116 is a module implemented in software by a processor performing clipping operations in response to executable instructions. In one embodiment, the clipping module 116 receives the clip identifiers 112b and generates supplemental vertices 118 within the viewable region and/or outside of the clipping region, as illustrated in further detail in FIGS. 6–7 below. The supplemental vertices are appended into the vertex buffer.

After the supplemental vertices have been added to the vertex buffer, the triangle list is issued. The vertex shader 102 will read vertex bin identifiers 119 to determine if a triangle is visible in the current render region and if so the vertices are read, a viewport transformation is performed and the triangles are issued to a setup engine (not shown in FIG. 1).

In one embodiment, the vertex buffer 120 actually comprises 3 separate buffers, a transformed vertex data buffer, a screen bin buffer and the clip buffer 113. In one embodiment, vertex identifiers index all of these buffers. The screen bin buffer includes data relating to the location of the vertices on the screen plus the guard band region. This data may be used to do a fast reject of triangles having multiple vertices when rendering across multiple regions and avoid having to read vertex data 106. The clip buffer 113 describes the vertex indices that refer to vertices that are completely outside the view frustum for corresponding Z planes and outside the guard band regions for corresponding X, Y planes. These represent vertices that would have to be clipped by software running on the CPU. These operations are performed during a first phase, referred to as a vertex transform phase.

In a second phase, a viewport transform phase, software executing a processing unit, such as the CPU, not shown, issues a list of triangle having vertex identifiers. The vertex shader 102 also executes a viewport transform code, which in one embodiment is a plurality of executable operating instructions for performing specific viewport operations. The viewport operations include, but are not limited to, perspective divide, mapping to screen space and back-face culling. Thereupon, the vertex shader 102 may issue a plurality of triangles having visible vertices, to a set-up engine (not shown).

Figure 2:
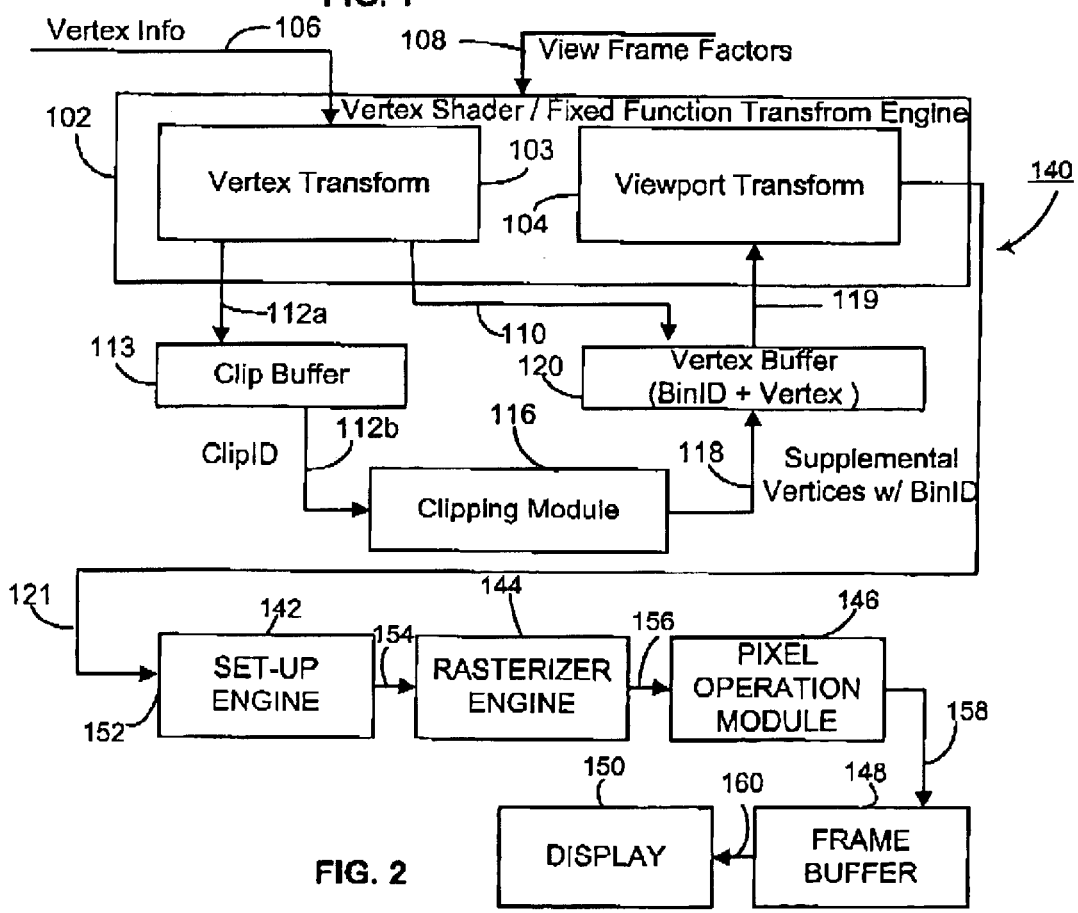
FIG. 2 illustrates a functional block diagram of an apparatus for graphics processing in a handheld device, in accordance with one embodiment of the present invention.

FIG. 2 illustrates another embodiment 140 of the present invention including the vertex shader 102 and the clipping module 116. As described above, the vertex shader 102 receives the vertex data 106, generates the bin identifiers 110 and uses the view frame factors 108 to generate the clip identifiers 112a. The clipping module 116 generates the supplemental vertices with clip identifiers 118 and provides these vertices 118 to the vertex shader 102. Thereupon the bin identifiers and supplemental vertices 121 generated via the viewport transform engine 104 are provided to a set-up engine 142.

FIG. 2 illustrates the pixel processing pipeline used to process the vertex information within the vertex buffer 120. In one embodiment, the pixel processing pipeline operates in accordance with known pixel processing techniques using the set-up engine 142, a rasterizer engine 144, a pixel operation module 146, a frame buffer 148 and a display 150. As described above, the vertex shader 102, upon executing the viewport transform, issues triangles 152 to the set-up engine 142. The set-up engine 142 generates the primitives 154 which are provided to the rasterizer engine 144, wherein the rasterizer engine 144 performs rasterization operations thereon. Upon generating a plurality of pixels 156, the pixel operation module 146 may thereupon perform any pixel operation, such as scaling, as recognized by one having ordinary skill in the art.

Thereupon, the pixel operation module 146 provides pixel output 158 to the frame buffer 148, which may be any suitable memory device as recognized by one having ordinary skill in the art. The frame buffer 148 receives the pixel output 158 and stores the pixel information therein. Once a frame has been saved in the frame buffer, a frame 160 is provided to the display. As the present invention provides for graphics processing in a handheld device, the display 150 may be a liquid crystal display, a small flat panel display or any other suitable display as recognized by one having ordinary skill in the art being capable of being disposed within a handheld device.

Figure 3:
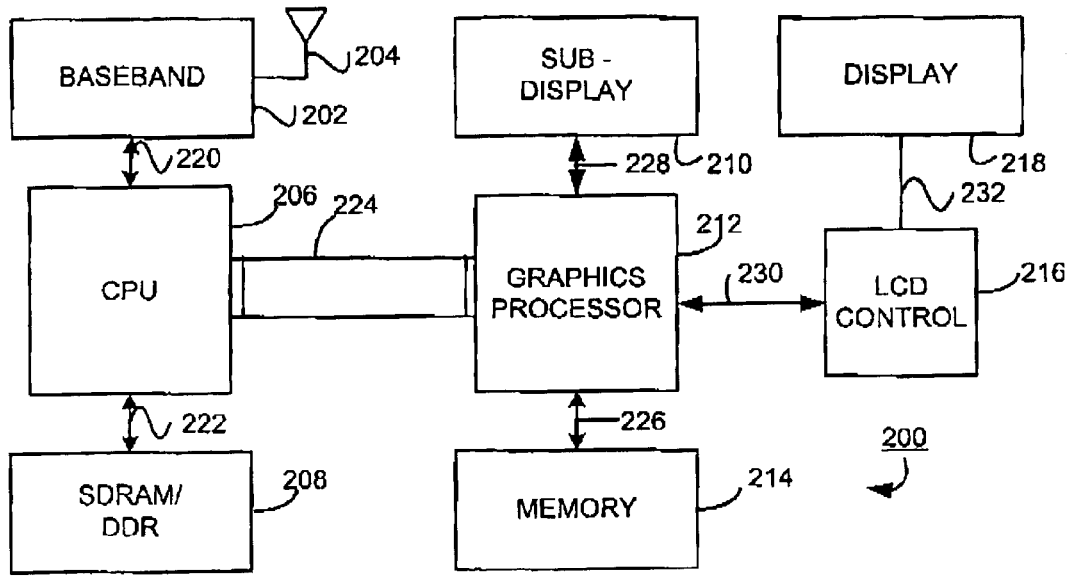
FIG. 3 illustrates a functional block diagram of a handheld device having graphics processing, in accordance with one embodiment of the present invention.

FIG. 3 illustrates a block diagram of a handheld device 200 including a baseband receiver 202 having an antenna 204, a CPU 206, a memory 208, a subdisplay 210, a graphics processor 212, another memory 214, an LCD control 216 and a display 218. In accordance with known handheld device operating techniques, the baseband receiver 202, receives and transmits communication information via the antennae 204. The baseband receiver 202 is coupled to the CPU 206 to provide communication information 220 thereacross. Furthermore, the CPU is coupled to the memory 208 to provide stored information 222 therebetween.

The CPU 206 is further coupled to the graphics processor 216 across a bus 224, which one embodiment may be a flex assembly for providing communication thereacross. In one embodiment, the graphics processor 212 may be coupled to and mounted on the flex assembly 224 for providing for the efficient utilization of limited space within a typical handheld device.

On one embodiment, the memory 208 may be a secured digital random access memory (SDRAM) or a DDR memory. It is further recognized that the memory 208 may be any suitable memory capable of storing information and executable instructions for the CPU 206 therein.

The CPU 206 and/or the graphics processor 212 may be, but not limited to, a single processor, a plurality of processors, a DSP, a microprocessor, ASIC state machine, or any other implementation capable of processing and executing software. The term processor should not be construed to refer exclusively to hardware capable of executing software, and may implicitly include DSP hardware, ROM for storing software, RAM, and any other volatile and non-volatile storage medium. Moreover, the memory 214 may be, but not limited to, a single memory, a plurality of memory locations, shared memory, CD, DVD, ROM, RAM, EEPROM, optical storage, microcode, or any other non-volatile storage medium capable of storing digital data for use by the graphics processor 212.

The graphics processor 212 is coupled to the memory 214 across the bus 226, wherein across the bus 226, in one embodiment, the bin identifiers and supplemental vertices 118 may be provided to the memory 214 acting as the vertex buffer 120 of FIG. 1. Graphics processor 212 is further coupled to the subdisplay 210 across a bus 228 which may be any suitable uni-directional or bi-directional bus providing for a limited output to a subdisplay 210. In accordance with one embodiment of the present invention, the subdisplay 210 may be a miniature display, similar to the display 218, but providing for a limited output, such as a viewing screen for providing a ten digit caller I.D. on a handheld device capable or providing for telephonic communications.

The graphics processor 212 is further coupled to the LCD control 216 across bus 230, which allows for the presentation of display data to be controlled and eventually provided to display 218 across bus 232. Similar to the embodiment described above in FIG. 2, the output display 158 provided from the frame buffer 148 to the display 150, wherein the frame buffer 148 may be disposed within the graphics processor 212 of FIG. 3 and the display 218 includes the display 150 having also the LCD control 216 for controlling operation therein.

The system 200 of FIG. 3 illustrates a general representation of an apparatus for graphics processing in a handheld device in accordance with one embodiment to the present invention. The CPU 206 performs specific operations and the graphics processor 212 performs other processing operations. Such that, the present invention improves graphics processing within the handheld device by allocating processing requirements among the various processors. Breaking the vertex transformations into two separate phases, the vertex transform phase and the viewport transform phase, allows the implementation of clipping efficiently on the CPU 206. The CPU 206 reads the clip buffer (not shown) disposed within the vertex buffer 120 illustrated in FIG. 1, to determine if there are any vertices to be clipped. In one embodiment, the clipped buffer may be disposed within the memory 208. If there are vertices to be clipped, using the indices, the CPU 206 generates new vertices in the corresponding screen bin identifiers and issues the triangle list. As such, since the percentage of vertices to be clipped is relatively small, the overhead on the CPU 206 and the bus 224 is thereby limited.

Figure 4:
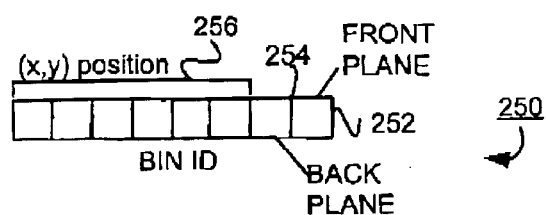
FIG. 4 illustrates a graphical representation of a bin identifier, in accordance with one embodiment of the present invention.

FIG. 4 illustrates graphical representation of one embodiment of a bin identifier 250. In one embodiment, the bin identifier 250 includes 8 bits, the least significant bit 252 representing a vertex in front of the near plane, the second least significant bit, representing a vertex outside the far plane 254 and the sixth most significant bits representing an X, Y position 256. In one embodiment, a viewing screen may be subdivided into a number of bins wherein the X, Y position 256 represents one of sixty-four possible bins in this embodiment. Therefore, the 6 bit flag 256 indicates the corresponding bin upon which the vertex is disposed.

As described above, the vertex shader 102 generates the bin identifiers 250 by utilizing known transformation techniques, including determining a viewport and a view frame area relative to camera and Z axis angles. Furthermore, a clipping region is determined by any position outside the view frustrum or outside the viewport region and a guard band region. In one embodiment, these elements may be determined by view frame factors 108.

Figure 5:
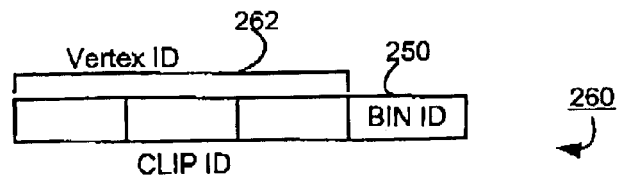
FIG. 5 illustrates a graphical representation of a clip identifier, in accordance with one embodiment of the present invention.

FIG. 5 illustrates graphical representation of a clip ID 260 having a corresponding bin ID 250 and a vertex ID 262. As described above, when a vertex is determined to be clippable, such a as violating Z or X, Y region restrictions, the clip ID 260 is generated from the 8 bit bin ID 250 and the vertex ID 262. Although, as recognized by one having ordinary skill in the art, the bin ID 250 may be any suitable number of bits to provide for further scalability of the present invention, including scalability in the number of grids and assignment of a bin identifier per vertex allocation.

In one embodiment, the clip ID 260 is a 32 bit flag having the bin ID 250 as bits 0–7. The clip ID 260 further includes the vertex ID 262 which is a 24 bit identifier used to index the vertex data as stored in the vertex buffer.

Figure 6:
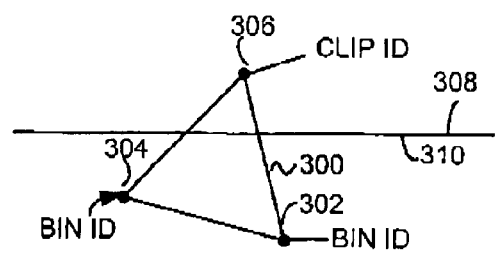
FIGS. 6–7 illustrates a graphical representation of an original triangle and modified triangle relative to a clipping region, in accordance with one embodiment of the present invention.
Figure 7:
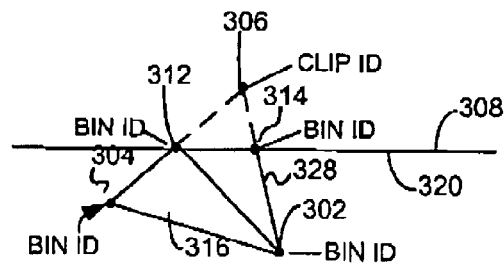

FIGS. 6 and 7 illustrate vertices before and after the clipping process. FIG. 6 illustrates a triangle 300 having three vertices, 302, 304 and 306. The clipping region 308 is defined as regions outside of the viewable area, in contradistinction to the viewable area 310. Based on graphics processing described above, an analysis of the vertices 302, 304 and 306 will provide for the generation of a clip ID for the vertex 306. Whereas, vertices 302 are 304 are within the viewable area 310, so no clip IDs are generated for these vertices.

In accordance with one embodiment of the present invention, FIG. 7 illustrates the generation of supplemental vertices of 312 and 314 having corresponding bin identifiers. The supplement vertices 312 and 314 are generated within the viewable region 320 outside of the clipping region 308. Through a calculation of the intersection of the edge of clipping region 308 between the clip ID for vertex 306 and the bin ID for vertex 302 provides for the location of the supplemental vertex 314. Furthermore, a calculation of the location between the clip ID for vertex 306 and the bin ID for vertex 304 upon the intersection of the clipping region 308 provides for the supplemental vertex 312. FIG. 7 illustrates the 2 newly generated triangles 316 and 328 having vertices (302, 304, 312 ) and (302, 312, 314 ), respectively, within the display area and outside of the clipping region 308.

Figure 8:
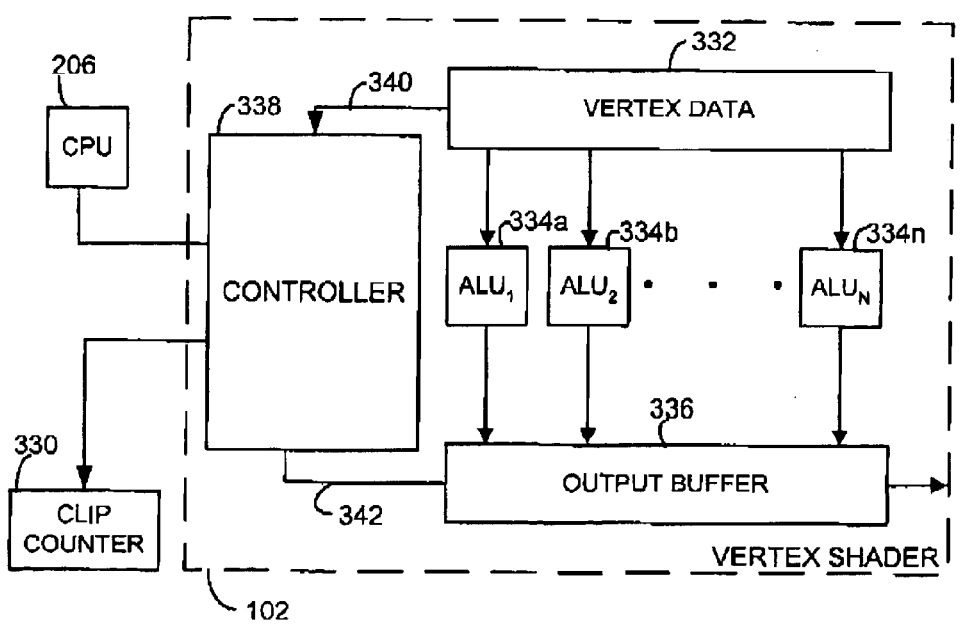
FIG. 8 illustrates a graphical representation of a graphics processor for performing the present invention.

FIG. 8 illustrates one embodiment of the vertex shader 102 coupled to the CPU 206 and a clip counter 330, in accordance with one embodiment of the present invention. In one embodiment, the vertex data 106 of FIG. 1, starts in a main memory, such as the memory 208 of FIG. 3 and is written to an input buffer. In one embodiment, using matrix multiplication, the vertex data 106 may be received as a series of data bits having the vertex information in a sequential order. In one embodiment, the CPU 206 creates clippable versions of the vertex information to form the supplemental vertices which are thereupon added to the list of vertex information. In one embodiment, the vertex shader 102 includes a vertex data buffer 332 storing vertex data therein which is provided to a plurality of arithmetic logic units 334(a), 334(b), 334(n). The arithmetic logic units provide arithmetic operations such that the vertex data is transformed to be provided to an output buffer 336. The vertex shader 102 further includes a controller 338 which receives control information 340 from the vertex data 332 and provides control information 342 to the output buffer 336 in accordance with known control techniques.

In accordance with the one embodiment of the present invention, whenever the vertex data is processed by the plurality of arithmetic logic units 334 and a clip identifier is generated, the controller 338 increments a value within the clip counter 330. The clip counter value 330 is thereupon provided to the CPU 206 such that the number of clipped vertices may be known and thereupon the CPU 206 may know the proper number of clipping operations to be performed to generate the supplemental vertices.

Figure 9:
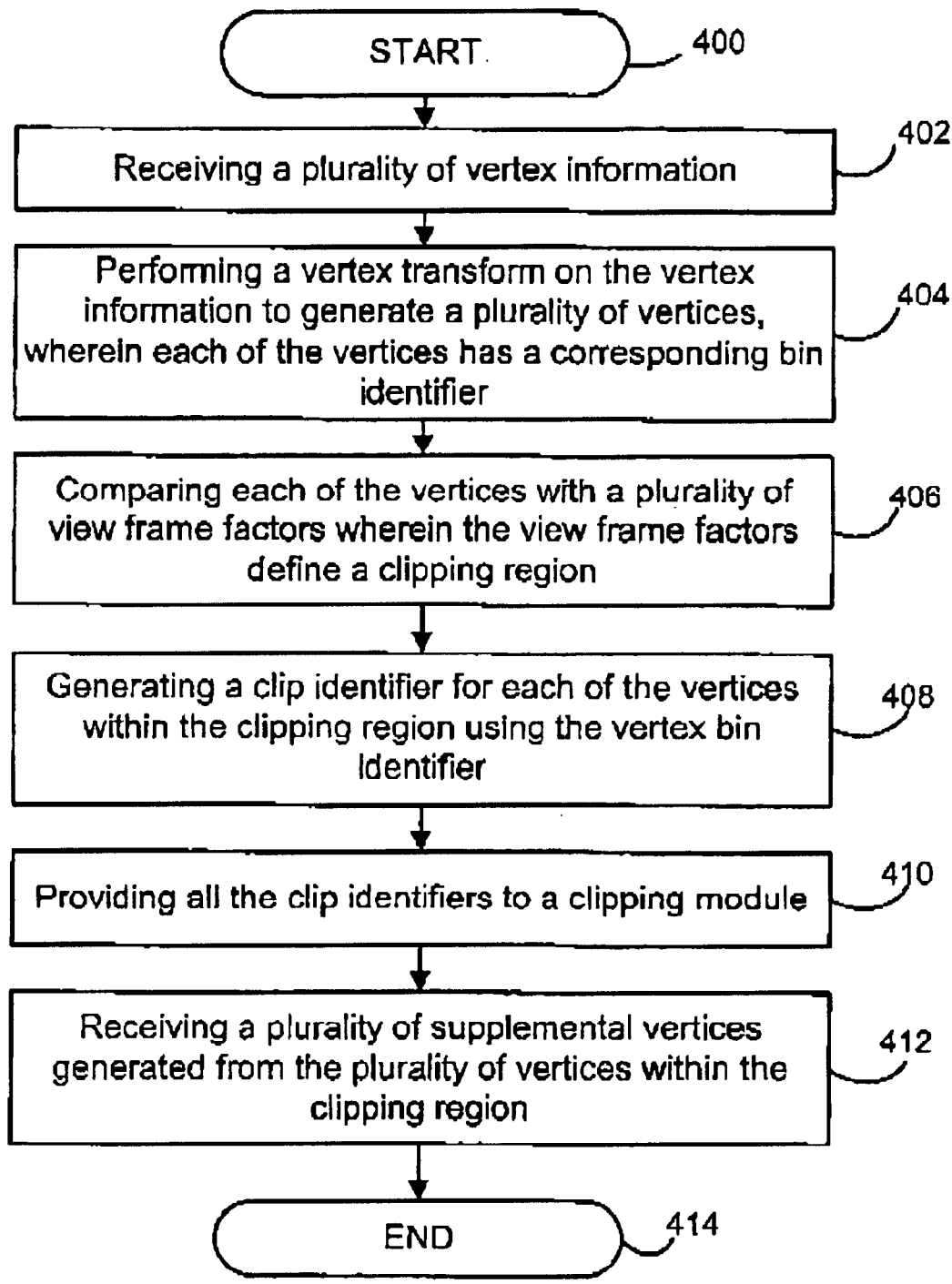
FIG. 9 illustrates a flowchart of the steps of a method graphics processing in a mobile device, in accordance with one embodiment of the present invention.

FIG. 9 illustrates the steps of one embodiment of a method for graphics processing of a handheld device. The method begins, step 400, by receiving plurality of vertex information, step 402. Similar to the embodiment described above in FIG. 1, the vertex information 106 is provided to the vertex shader 102. The next step, step 404, is performing a vertex transform on the vertex information to generate a plurality of vertices, wherein each of the vertices has a corresponding bin identifier.

Thereupon, the method includes comparing each of the vertices with a plurality of view frame factors wherein the view frame factors define a clipping region, step 406. As discussed above, the view frame factors may include a guard band region, a view frustrum, or any other suitable factors for defining the clipping region. The next step, step 408 includes generating a clip identifier for each of the vertices within the clipping region using the vertex bin identifier. In one embodiment, the step may be performed by the vertex shader 102. Thereupon, the next step, step 410 includes providing the clip identifiers to a clipping module. In one embodiment, the clipping module may be the central processing unit executing clipping module software thereon.

The next step is receiving a plurality of supplemental vertices generated from the plurality of vertices within the clipping region, step 412. As described above, the supplemental vertices include newly generated vertices within the viewable region such that new triangles may be formed having vertices all within the viewable region. Thereupon, the method is complete, step 414. As recognized by one having ordinary skill in the art, the above method is an exemplary embodiment of the present invention.

Figure 10:
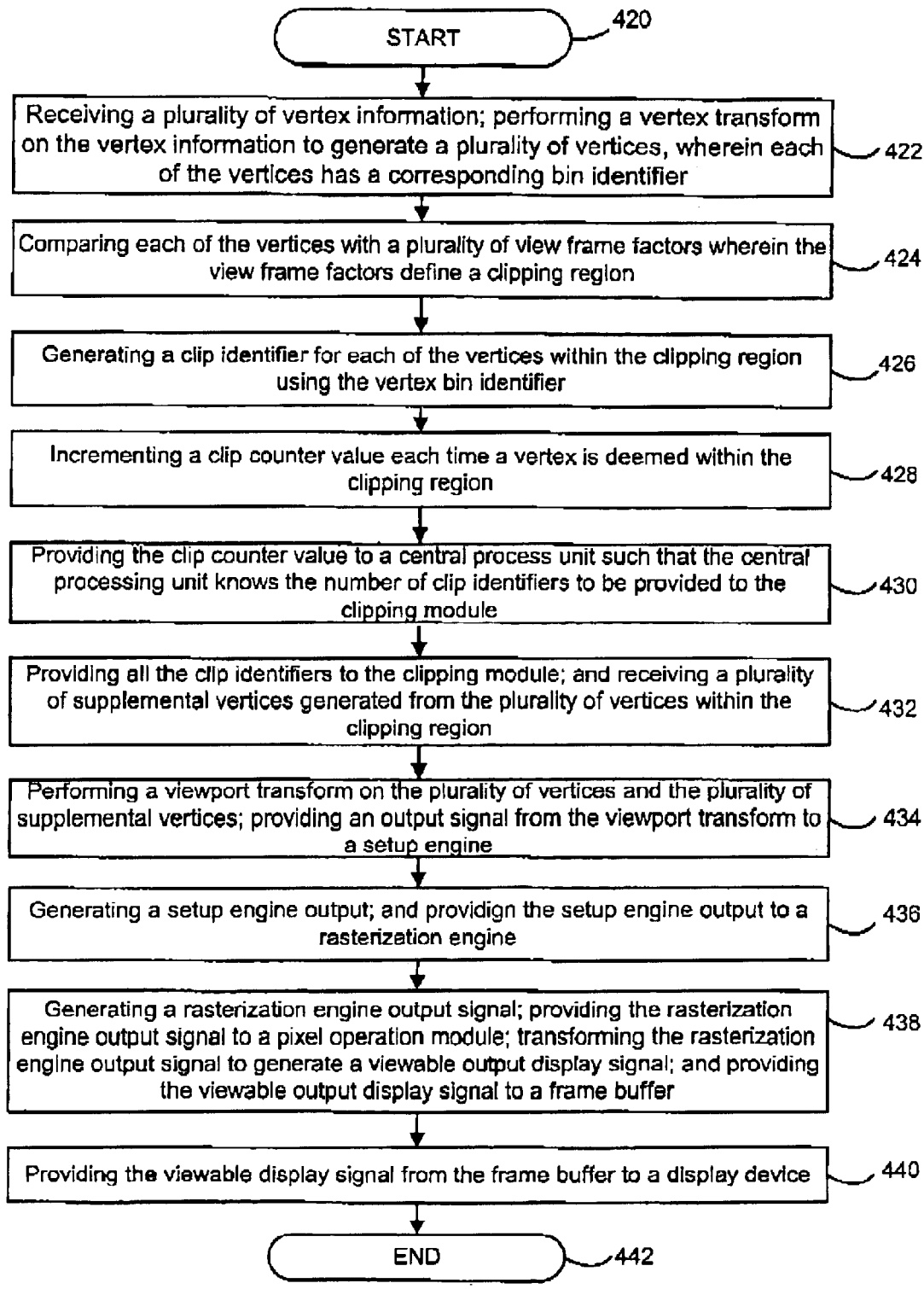
FIG. 10 illustrates a flowchart of the steps of a method for graphics processing in a mobile device, in accordance with one embodiment of the present invention.

FIG. 10 illustrates another embodiment of a method for graphics processing on a handheld device, the method beginning step 420, by receiving a plurality of vertex information, performing a vertex transform on the vertex information to generate a plurality of vertices, wherein each of the vertices has a corresponding bin identifier, step 422. The next step is comparing each of the vertices with a plurality of view frame factors, wherein the view frame factors define a clipping region step 424. Thereupon, step 426, a clip identifier is generated for each of the vertices within the clipping region using the vertex bin identifier.

The method further includes incrementing a clip counter value, each time a vertex is deemed within the clipping region step 428. As described above, with regard to FIG. 8, the clip counter 330 is incremented by the controller for every time a clip identifier is generated.

The next step is providing the clip counter value to a central processing unit, such that the central processing unit knows the number of clip identifiers to be provided to the clipping module, step 430. The next step is providing all the clip identifiers to the clipping module and receiving a plurality of supplemental vertices generated from the plurality of vertices within the clipping region, step 432. Thereupon, the method includes performing a viewport transform on the plurality of vertices and the plurality of supplemental vertices, providing an output signal from the viewport transform to a set up engine, 434. As discussed above with regards to FIG. 2, the viewport transform may be performed within the vertex shader 102 such that the setup engine 142 receives the information 152. The next step includes generating a setup engine output and providing the set up engine output to a restoration engine, step 436. The next step, step 438, is generating a rasterization engine output signal, providing the rasterization engine output signal to a pixel operation module, transforming the rasterization output signal to generate a viewable output display signal and providing a viewable output display signal to a frame buffer. Thereupon, the next step is providing the viewable display signal from the frame buffer to a display device, step 440. Wherein steps 436, 438 and 440 are described further above with regards to FIG. 2. As such, in one embodiment of the present intervention, the method is complete, step 442.

Figure 11:
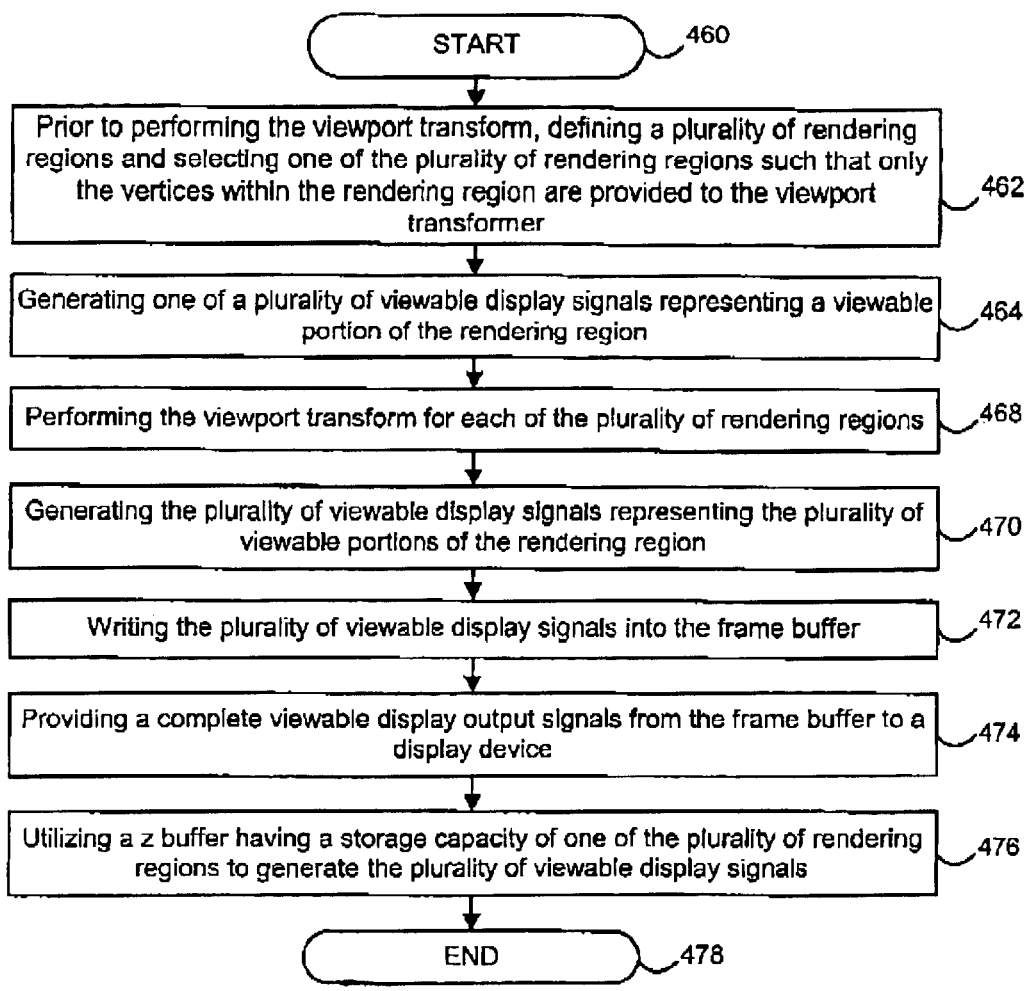
FIG. 11 illustrates a flowchart of the steps of a method for graphics processing in a mobile device, in accordance with one embodiment of the present invention.

FIG. 11 illustrates the steps of another embodiment of a method for graphics processing in a handheld device. The method begins, step 460, wherein prior to performing the viewport transform, step 462 includes defining a plurality of rendering regions and selecting one or more of the plurality of rendering regions such that only the vertices within the rendering region (determined by the vertex bin identifiers) are provided to the viewport transformer. In one embodiment, the display area may be divided into multiple regions wherein each region defines a specific area in x and y coordinates of a viewable area. For example, a display may be divided into four separate regions having a central dividing line down the middle of the "x" axis and the middle of the "y" axis defining four equally rectangular regions.

The next step, step 464, is generating one of a plurality of viewable display signals representing a viewable portion of the rendering region, step 464. In this embodiment, the same rendering techniques as described above in the steps of FIG. 9 and/or 10 may be utilized to generate the viewable display signal, wherein the viewable area has been defined as a smaller area, thereby increasing the clipping region to all regions not within the selected rendering region, step 468. In the exemplary embodiment where the viewing area is divided into four rendering regions, the viewport transform would be performed four times, once for each of the rendering regions. The next step, step 470, is generating the plurality of viewable display signals representing the plurality of viewable portions of the rendering region. Thereupon, step 472 is writing the plurality of viewable display signals into the frame buffer. As such, as steps 468 through 472 are repeated, for all of the rendering regions, contained within the frame buffer is thereupon a complete viewable display signal.

The next step, step 474, is providing a complete viewable display output signal from the frame buffer to a display device. In one embodiment, the method further includes utilizing a "z" buffer having a storage capacity of one or more of the plurality of rendering regions to generate the plurality of viewable display signals, step 476. Therefore, in this embodiment, there is a reduction in the required amount of storage space as a "z" buffer may be utilized having only storage capacity up to a single rendering region. Taking this embodiment further, in a limited memory situation, the rendering region may be dissected into a larger number of viewable portions to accommodate a limited "z" buffer memory space, wherein the "z" buffer memory may be dumped once the viewable display signal is written into the frame buffer. Thereupon, the method is complete, step 478.

Figure 12:
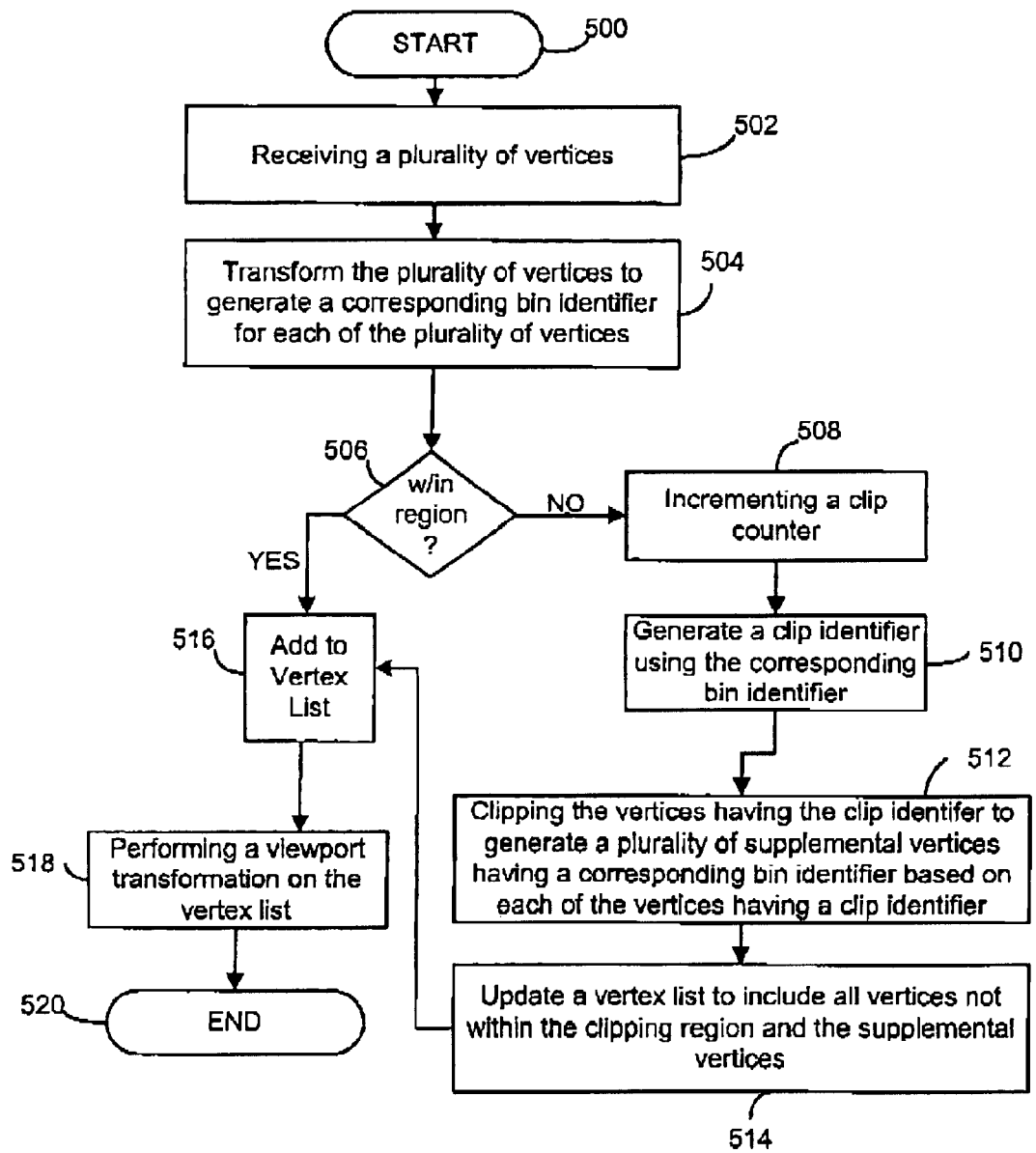
FIG. 12 illustrates a flowchart of the steps of a method for graphics processing in a mobile device, in accordance with one embodiment of the present invention.

FIG. 12 illustrates a further embodiment of the method for graphics processing in a handheld device. The method begins, 500, by receiving a plurality of vertices, step 502. The method further includes transforming the plurality vertices to generate a corresponding bin identifier for each of the plurality advertises, step 504.

The next step, step 506, is a determination of whether each of the plurality of vertices is within a viewable region. When one of the vertices is not within the viewing region, thereby within a clipping region, step 508 is incrementing a clip counter. The next step, step 510, is generating a clip identifier using the corresponding bin identifier. Thereupon, the method includes clipping the vertices having the clip identified plurality of supplemental vertices having a corresponding bin identifier based on each of the vertices having a clip identifier, step 512. Thereupon, step 514, includes updating a vertex list to include all of the vertices not within the clipping region and the newly generated supplemental vertices.

The next step is to add the supplemental vertices to the vertex list, step 516. Referring back to step 506, if it is determined that the vertices is within the viewing region, the vertices is directly added to the vertex list, step 516. Thereupon, once the vertices are added to the vertex list, step 518 is performing a viewport transform on the vertex list. As discussed about with regards to, among other places, FIG. 1, the viewport transform may be performed in one embodiment by the vertex shader 102 of FIG. 1. Thereupon, the method is complete, step 520.

The above method may further be implemented in another embodiment incorporating the method of FIG. 11, wherein a plurality of rendering regions are defined prior to performing the viewport transform.

The present invention provides for graphics processing in a handheld device through the efficient utilization of limited bandwidth and processing requirements. Through offloading CPU processing cycles and allowing for the efficient clipping of vertices not within the clipping region, but rather within the viewable region, a reduction in the amount of processing is required. Moreover, through utilizing the associated bin identifiers and clip identifiers in conjunction with supplemental vertices, furthermore in conjunction with the clip counter providing for indication to the CPU of the number of clipped vertices to be recalculated as supplemental vertices, the gate size of the graphics processor and memory bandwidth required to render a scene can be reduced. Therefore, in the limited processing environment of a typical handheld device, the present invention allows for improved graphics rendering, improving processing speeds and reducing graphics chip die size, power consumption and memory bandwidth requirements.

It should be understood that there exists implementations of other variations and modifications of the invention and its various aspects, as may be readily apparent to those of ordinary skill in the art, and that the invention is not limited by the specific embodiments described herein. For example, the generation of clip identifiers based on a defined clipping region may be performed in an "on the fly" calculation, providing for a further reduction in memory storage requirements. It is therefore contemplated to cover by the present invention, any and all modifications, variations, or equivalents to fall within the spirit and scope of the basic underlying principles disclosed and claimed herein.

What is claimed is:

1. An apparatus for graphics processing in a handheld device, the apparatus comprising:
   at least one of: a transform engine and a vertex shader, such that the at least one of the transform engine and the vertex shader is capable of receiving a plurality of vertex information and generating a plurality of vertices, wherein each of the vertices has a corresponding bin identifier;
   a plurality of view frame factors defining a clipping region, upon which the vertex shader compares each of the plurality of vertices, wherein when one of the vertices is within the clipping region, a clip identifier is generated for that vertex using the corresponding bin identifier;
   the vertex shader operably coupleable to a clipping module on a central processing unit (CPU) wherein when one of the vertices is within the clipping region, the vertex shader provides the vertices having a corresponding clip identifier to the clipping module which thereupon generates supplemental vertices and the vertex shader receives the supplemental vertices therefrom; and
   a vertex buffer operably coupled to the vertex shader wherein the vertex buffer receives the plurality of vertices and the supplemental vertices from the clipping module on the CPU and stores the plurality of vertices therein.

2. The apparatus of claim 1 further comprising:
   a setup engine operably coupled to the vertex shader wherein the setup engine receives the plurality of vertices and the supplemental vertices.

3. The apparatus of claim 2 further comprising:
   a rasterization engine coupled to the setup engine for receiving a setup engine output; and
   a pixel operation module coupled to the rasterization engine and the frame buffer such that the pixel operation module transforms a rasterization engine output signal and provides a viewable output display signal to the frame buffer.

4. The apparatus of claim 3 further comprising:
   a display device operably coupled to the frame buffer such that upon generation of a viewable display from the viewable output display signal, the viewable display may be provided to the display device from the frame buffer.

5. The apparatus of claim 4 wherein the display device is a liquid crystal display.

6. The apparatus of claim 1 wherein the plurality of view frame factors include at least one of the following: a view frustum region and a guard band region.

7. The apparatus of claim 1 further comprising:
   a clip counter having a clip counter value such that the clip counter value is incremented each time one of the vertices is deemed within the clipping region and once all of the plurality of vertices have been generated by the vertex shader, the clip counter value is provided to a central processor such that the central processor may properly retrieve the corresponding number of clip identifiers.

8. The apparatus of claim 1 wherein the clipping module is disposed on a central processor and the apparatus is coupled to the central processor across a bus and the transform engine is disposed within the vertex shader.

9. A method for graphics processing in a handheld device, the method comprising:
   receiving a plurality of vertex information;
   performing a vertex transform on the vertex information to generate a plurality of vertices, wherein each of the vertices has a corresponding bin identifier and a corresponding vertex identifier;
   comparing each of the vertices with a plurality of view frame factors wherein the view frame factors define a clipping region;
   generating a clip identifier for each of the vertices within the clipping region using the corresponding bin identifier and the corresponding vertex identifier;
   providing the clip identifiers to a clipping module; and
   receiving a plurality of supplemental vertices generated from the plurality of vertices within the clipping region.

10. The method of claim 9 further comprising:
    incrementing a clip counter value each time one of the vertices is deemed within the clipping region; and
    providing the clip counter value to a central processor such that the central processing knows the number of clip identifiers to be provided to the clipping module.

11. The method of claim 9 further comprising:
    performing a viewport transform on the plurality of vertices and the plurality of supplemental vertices.

12. The method of claim 11 further comprising:
    providing an output signal from the viewport transform to a setup engine.

13. The method of claim 12 further comprising:
    generating a setup engine output; and
    providing the setup engine output to a rasterization engine.

14. The method of claim 13 further comprising:
    generating a rasterization engine output signal;
    providing the rasterization engine output signal to a pixel operation module;
    transforming the rasterization engine output signal to generate a viewable output display signal; and
    providing the viewable output display signal to a frame buffer.

15. The method of claim 14 further comprising:
    providing the viewable display signal from the frame buffer to a display device.

16. The method of claim 11 wherein prior to the step of performing the viewport transform, the method further comprises:
    receiving a list of triangles to be rendered, wherein the triangle is defined by three vertices;
    for each of the triangles in the list of triangles, determining if each of the vertices defining the triangle is within the clipping region; and
    discarding the vertices within the clipping region thereby generating a list of only triangles having vertices within the clipping region.

17. The method of claim 16 further comprising:
    prior to performing the viewport transform, defining a plurality of rendering regions and selecting one of the plurality of rendering regions such that only the vertices within the rendering regions are provided to the viewport transformer;
    generating one of a plurality of viewable display signals representing a viewable portion of the rendering region; and writing the viewable display signal to a frame buffer, wherein the viewable display signal is directed to the selected rendering region.

18. The method of claim 17 further comprising:

performing the viewport transform for each of the plurality of rendering regions;

generating the plurality of viewable display signals representing the plurality of viewable portions of the rendering region;

writing the plurality of viewable display signals into the frame buffer; and providing a complete viewable output display signal from the frame buffer to a display device, wherein the complete viewable display output signal includes the plurality of viewable display signals, thereby capable of generating a complete output display.

19. The method of claim 18 further comprising:

utilizing a z buffer having a storage capacity of one of the plurality of rendering regions to generate the plurality of viewable display signals.

20. A method for graphics processing in a handheld device comprising:

receiving a plurality of vertices;

transforming the plurality of vertices to generate a corresponding bin identifier and a vertex identifier for each of the plurality of vertices;

for each vertex, determine if the vertex is within a clipping region;

if the vertex is within a clipping region:
incrementing a clip counter; and
generating a clip identifier using the corresponding bin identifier and the vertex identifier;

clipping the vertices having the clip identifier to generate a plurality of supplemental vertices having a corresponding bin identifier based on each of the vertices having a clip identifier;

updating a vertex list to include all vertices not within the clipping region and the supplemental vertices; and performing a viewport transformation on the vertex list.

21. The method of claim 20 further comprising:

dividing a full frame into a plurality of frame portions;

defining the clipping region to include all vertices outside one of the plurality of frame portions such that the vertex list only includes vertices within the one of plurality of the frame portions;

after performing the viewport transformation on the vertex list, generating a viewable output display signal representing the frame portion; and writing the viewable output display signal in a frame buffer.

22. The method of claim 21 further comprising:

for each of the plurality of frame portions:
defining the clipping region to include all vertices outside one of the plurality of frame portions such that the vertex list only includes vertices within the one of the plurality of frame portions;
after performing the viewport transformation on the vertex list, generating a viewable output display signal representing the frame portion; and
writing the viewable output display signal in a frame buffer; and providing the plurality of viewable output display signal from the frame buffer to an output display.

23. The method of claim 22 further comprising:

during the generation of viewable output display signal, utilizing a z buffer having a storage capacity of one of the plurality of rendering regions to generate the plurality of viewable display signals.

24. The method of claim 20 wherein the step clipping the vertices is performed by a central processing unit.

25. The method of claim 20 wherein the step of transforming the plurality of vertices and the step of viewport transformation is performed on a graphics processor.

26. A graphics processing device for a handheld device comprising:

a vertex shader capable of receiving a plurality of vertex information and generating a plurality of vertices, wherein each of the vertices has a corresponding bin identifier;

a central processing unit coupled to a vertex shader;

a plurality of view frame factors defining a clipping region, upon which the vertex shader compares each of the plurality of vertices, wherein when one of the vertices is within the clipping region, a clip identifier is generated for that vertex using the corresponding bin identifier;

a clip counter having a clip counter value such that the clip counter value is incremented each time a vertex is deemed within the clipping region and once all of the plurality of vertices have been generated by the vertex shader, the clip counter value is provided the central processor such that the central processor may properly retrieve the corresponding number of clip identifiers;

the vertex shader provides the vertices having a corresponding clip identifier to the central processor executing a clipping module such that the clipping module generates a plurality of supplemental vertices and the vertex shader receives the supplemental vertices from the central processor; and a vertex buffer operably coupled to the vertex shader wherein the vertex buffer receives the plurality of vertices and the supplemental vertices from the vertex shader and stores the plurality of vertices therein.

27. The graphics processing device of claim 26 further comprising:

a setup engine operably coupled to the vertex shader wherein the setup engine receives the plurality of vertices and the supplement vertices;

a rasterization engine coupled to the setup engine for receiving a setup engine output; and a pixel operation module coupled to the rasterization engine and the frame buffer such that the pixel operation module transforms a rasterization engine output signal and provides a viewable output display signal to the frame buffer.

28. The graphics processing device of claim 27 further comprising:

a display operably coupled to the frame buffer such that upon generation of a viewable display from the viewable output display signal, the viewable display may be provided to the display from the frame buffer.

29. The graphics processing device of claim 26 wherein the plurality of view frame factors include at least one of the following: a depth factor, a view frustum region and a guard band region.

30. The graphics processing device of claim 26, wherein the vertex shader includes a transform engine such that the transform engine generates the plurality of vertices.

* * * * *